(12) United States Patent
Borman

(10) Patent No.: US 7,188,580 B1
(45) Date of Patent: Mar. 13, 2007

(54) VARIABLE-GEOMETRY GRADUATED SURFACE-FOIL FOR WING-IN-GROUND EFFECT VEHICLES

(76) Inventor: David L. Borman, 156 Flamingo St., Fort Myers Beach, FL (US) 33931

( * ) Notice: Subject to any disclaimer, the term of this patent is extended or adjusted under 35 U.S.C. 154(b) by 226 days.

(21) Appl. No.: 10/895,718

(22) Filed: Jul. 21, 2004

(51) Int. Cl.
- *B60V 1/11* (2006.01)
- *B60V 3/04* (2006.01)
- *B63B 1/22* (2006.01)

(52) U.S. Cl. .................. 114/272; 114/283; 114/284; 114/67 A; 180/117

(58) Field of Classification Search .............. 114/67 A, 114/271–287; 180/116–130; 244/105–109, 244/12.1, 12.6
See application file for complete search history.

(56) References Cited

U.S. PATENT DOCUMENTS

| | | | | |
|---|---|---|---|---|
| 1,846,602 A | * | 2/1932 | Edison | 114/283 |
| 2,722,189 A | * | 11/1955 | William | 114/276 |
| 3,082,976 A | * | 3/1963 | Dornier | 244/12.1 |
| 3,118,411 A | * | 1/1964 | Koriagin | 114/273 |
| 3,288,096 A | * | 11/1966 | Swenson | 114/273 |
| 3,308,780 A | * | 3/1967 | Abramson | 114/283 |
| 3,627,235 A | * | 12/1971 | Lippisch | 244/12.1 |
| 3,636,906 A | * | 1/1972 | Wray | 114/273 |
| 3,661,111 A | * | 5/1972 | Lippisch | 114/67 A |
| 3,830,448 A | * | 8/1974 | Lippisch | 244/2 |
| 3,998,176 A | * | 12/1976 | Stout et al. | 114/283 |
| 4,005,667 A | * | 2/1977 | Staba | 114/283 |
| 4,080,922 A | | 3/1978 | Brubaker | |
| 4,505,442 A | | 3/1985 | Kirsch et al. | |
| 4,685,641 A | | 8/1987 | Kirsch et al. | |
| 4,705,234 A | | 11/1987 | Bourn | |
| 4,712,630 A | | 12/1987 | Blum | |
| 5,026,002 A | | 6/1991 | Yarrington | |
| 5,029,548 A | * | 7/1991 | Bernitsyn et al. | 114/272 |
| 5,314,035 A | | 5/1994 | Schoell | |
| 5,697,468 A | * | 12/1997 | Russell et al. | 180/116 |
| 5,711,494 A | | 1/1998 | Saiz | |
| 6,230,835 B1 | | 5/2001 | Fischer et al. | |
| 6,547,181 B1 | | 4/2003 | Hoisington et al. | |
| 6,732,672 B2 | * | 5/2004 | Shin et al. | 114/272 |

FOREIGN PATENT DOCUMENTS

| | | | |
|---|---|---|---|
| JP | 62152960 A | * | 7/1987 |
| WO | WO 9311986 A1 | * | 6/1993 |

\* cited by examiner

*Primary Examiner*—Ajay Vasudeva

(57) ABSTRACT

The invention is a marine wing-in-ground effect vehicle capable of sustained high speed operation in varying seas. The vehicle comprises an aerodynamic flat bottom lifting wing with a fuselage, a longitudinal keel member under the wing, a propulsion unit installed in the keel member, a vertical stabilizer airfoil mounted on top of the wing, and an overturn prevention tail at an aft end the wing. Port and starboard surface foils are pivotably mounted under the wing, and taper from a wider front end to a substantially narrow trailing end. The surface foils are selectively and independently pivoted between a deployed position and a retracted position by an actuator.

3 Claims, 11 Drawing Sheets

VARIABLE-GEOMETRY GRADUATED SURFACE-FOIL FOR WING-IN-GROUND EFFECT VEHICLES

FIELD OF THE INVENTION

This invention relates to marine wing-in-ground (W.I.G.) effect vehicles, specifically to flight control and air/water interface devices and, more particularly, to a marine vehicle having an aerodynamic flat bottom lifting body, a rear propulsion means, twin front-mounted independently adjustable foils, a vertical stabilizing fin and a rear mounted anti blow-over tail device.

BACKGROUND OF THE INVENTION

Ground effect vehicles have been developed in both fields of aeronautics and marine craft. Ground effect vehicles are those vehicles which receive reduced drag due to the reduction of wing-tip vortices while traveling at low altitudes near ground, and more typically, near water. The closer the wing tip is to the ground or water, the lower the drag. Ground effect vehicles generally comprise marine craft and aircraft. The two are typically distinguished by those that can sustain extended flight without the aid of ground effect (aircraft) and those that cannot (marine craft). The International Civil Aviation Organization (ICAO) and International Maritime Organization (IMO), both organizations of the United Nations, jointly exercise jurisdiction over these vehicles. The ICAO and IMO have also united to develop uniform navigation and safety rules for these types of vehicles, expected to be published by the year 2004.

The marine engineering arts have developed ground effect craft that either induce ground effect, such as hovercraft, or utilize some benefits of ground effect in combination with hydrodynamic hull and fin arrangements, such as catamarans and hydrofoils. Other maritime ground effect aircraft are being developed, and typically include ground effect wings to provide greater stability and lift. They cannot, however, sustain flight without maintaining close distance to the ground.

The aeronautical engineering arts have also advanced ground effect vehicles beginning with the Russian Ekranoplan KM, also known as the Caspian Sea Monster, which was developed in the 1960s for cargo transport and missile delivery applications. The KM uses extended wings with negative dihedral winglets on each end in order to promote the ground effect. The negative dihedral winglets are generally allowed to touch water if the KM is unintentionally flown too low. However, allowing the winglets to touch the water substantially increases drag, and may damage the wing or winglets. As such, the structural weight of the wing must be increased to account for water loads. If too much of the winglets contact water, the airplane may also experience stability problems.

Hoisington and Rawdon disclose in U.S. Pat. No. 6,547,181 (assigned to The Boeing Company, Seattle Wash.), a ground effect wing having a variable sweep winglet. They describe the winglet as "positionable at a sweep angle to control winglet tip clearance from ground". They state; "Variable winglet tip clearance reduces the risk of damage or instability due to collision with the ground or water, thereby permitting more efficient flight at lower altitude with an equivalent safety." Clearly, the reference here is to aircraft flying at very low altitude (in Wing Ground-Effect—W.I.G)

Reslein, in U.S. Pat. No. 5,727,495 1998 discloses an example of an active aeronautically controlled vessel. Such an approach succeeds at 30,000 feet where an operator would have several minutes to regain manual control following a system failure, but at mere meters off the sea surface any failure of such a complex flight system while in ground effect would be catastrophic At one hundred miles per hour and two meters off the sea surface an operator would have less than one quarter of one second to regain manual control. Insufficient time to manually react. Human reflex time generally is too slow to visually anticipate and adjust for varying wave heights.

In U.S. Pat. Nos. 4,505,442 and 4,685,641, Kirsch et al, disclose a transient Air and Surface contact vehicle and a Transient Surface contact vehicle. In both cases, the vehicle is propelled by some form of air propulsion system as opposed to a water propulsion system. The vessels are designed to skim across the water surface on a plurality of adjustable struts. These vehicles share a similar aerodynamic shape and are essentially aircraft designed to fly in close proximity to a water surface. In neither case is any provision made for bank and turn capability nor is there any provision for providing directional stability in the face of random wave surfaces striking the forward struts.

In U.S. Pat. No. 5,026,002, Yarrington discloses an amphibious vehicle having an aerodynamic wing attached to a main fuselage with a centrally positioned channel flow tunnel under the middle thereof. It has at least one large diameter in-fuselage ducted fan assembly is housed in a duct extending through the fuselage and at least one main helicopter-like rotary assembly on a supporting superstructure above the main fuselage. A tail is connected to the main fuselage and has areas appropriate to an anti-torque mechanism. This vehicle is essentially a helicopter designed to fly in close proximity to a water surface. Any ground effect is created by the down force of the fan blade assembly and the supporting foils are designed to leave the water surface at cruising speeds.

In U.S. Pat. No. 5,711,494 Saiz discloses a hydrofoil comprising a flat vessel of aerodynamic profile which, together with small planes, produces an aerodynamic lift, and the broad base of the hull contains a set of flexible fins whose cross-sections reduce from relatively thick inner ends of relatively large cross-section to relatively thin outer ends of smaller cross-section. The fins are inclined rearward to the vessel. Forward motion by whatever air flow propulsion system is used, produces a hydrodynamic lift. This design does not provide for any bank-turn mechanism, anti blow-over tail device, or gyroscopic stabilization system connected to the lift fins.

In U.S. Pat. No. 4,705,234, Bourn discloses a Ram Wing surface effect vehicle having a hull of generally rectangular shape concave at the front underside and contouring to a flat planing hull at the stern, an upper surface forming an airfoil, a passenger/operator's cabin is mounted on top of the hull and support a ram wing and propulsion system. The disadvantages of this design include the use of a high drag horizontal air foil, no capability of responding to variable sea states while at speed, and lack of a blow-over device at the rear. This vessel is not designed to remain in contact with the water at speed, so it is essentially an aircraft designed to fly in close proximity to a water surface.

In U.S. Pat. No. 4,712,630, Blum discloses a ground effect vehicle consisting of a central wing-like support body, floats and/or undercarriage units located on both sides of the support body, a thrust generator located in front of the support body, a control surface and a cabin. This vessel is not designed to remain in contact with the water at cruising speeds and is an aircraft designed to fly in close proximity to a water surface.

In U.S. Pat. No. 5,314,035, Schoell discloses a surface effect vehicle having a pair of lifting scoops or air foils mounted on a vehicle body, one in front and the other in the rear. Each lifting scoop has an arched leading edge to collect air under the scoop to lift the vehicle on a cushion of air. The vehicle has a pusher type engine with a propeller to push the vehicle. There are no movable foils and no facility for bank and turn maneuvering or for dealing with unpredictable wave forms striking the vehicle at speed.

In U.S. Pat. No. 6,230,835, Fischer et al disclose a ground effect vehicle comprising a hydrofoil or hydrofoil outer parts which can pivot about a parallel line relative to the longitudinal axis of the body in order to increase the speed range when flying close to the ground. This craft is designed to avoid touching the water of ground surface and is therefore an aircraft not a marine vehicle.

In U.S. Pat. No. 4,080,922, Brubaker discloses a Flyable Hydrofoil Vessel capable of achieving hull borne, foil borne and airborne configurations. It does not utilize maritime ground effect.

Most inventor/designers of wing-in-ground effect craft vehicles incorporate neither transitional lift assist devices, nor design-integrated flight control hardware other than conventional type systems designed for aircraft. They rely upon traditional aeronautical engineering principals for operation and control. Albeit, with improved wing design for best performance in ground-effect. Note the original marine ground-effect craft patent; Lippisch (1965) U.S. Pat. No. 3,190,582. This was essentially a conventional aircraft, but it also had an airfoil plan optimized for ground effect.

The problem with the application of traditional aeronautical engineering to marine based wing-in ground effect vehicles is that there is currently no widely available civilian technology to produce a vehicle structure light enough to operate in complete free flight, yet sturdy enough to withstand the potential forty –G impact of hitting an eight foot wave at one hundred miles per hour.

Producing a vessel sturdy enough for safe high-speed maritime operation in ground effect will require some form of waterborne lift assist device. Simple ski, or water-plane type devices provide the required additional lift.

U.S. Pat. No. 5,950,559 Klem utilizes a simple forward mounted ski. but will only function effectively within very limited and consistent sea states. In addition. a ski-plane area large enough to provide sufficient lift at slow speed will transmit too great a shock load to the vessel's structure at high speed and likely break it apart. A ski-plane area small enough to provide proper lift assist at high speed will not have enough water-plane area to lift the vessel free and clear of the water for a clean transition to flight mode from low speed water mode. A simple ski on stilts will not have much of a chance of structural survival against severe wave impact loads.

In U.S. Pat. No. 4,095,549. Williams discloses a solution for air/water interface device for ground effect craft while in high speed cruise mode. However, without variable geometry foil control. and retractable foil appendages, this design presents the opposite problem of the simple ski design. There is no bank turn ability for safe high speed maneuvering. The additional drag induced by the fixed, extended foils during the critical transition phase between high drag water born operation. and low drag airborne cruise mode, requires more installed horsepower than would be commercially viable. Extra engine weight and fuel burn will be too high for economic operation. It has also been found in ocean based model tests that this, and other designs, one foil forward, two aft; tricycle gear layout also causes lateral control problems as the single forward foil launches off to either side of uneven wave crests.

Thomas A. Edison Lake, U.S. Pat. No. 1,846,602 disclosed a two foils forward with one aft tail dragger configuration that tests have proven to provide the best response over variably sloping wave crests. He disclosed a form of variable geometry with freely hinged water planes. Without attack angle control however, and no variable foil geometry to gradually and automatically reduce water plane area with speed increases, pounding in a seaway would be significant and destructive as it would be to any flat ski design. The jet powered Convair Sea Dart design decades later drew upon Edison Lake's plan form and flat skis, but as a supersonic military fighter it was impractical for passenger transport.

In U.S. Pat. No. 3,762,355 Raynes discloses a Water Craft with Aerodynamic lift propelled by an aircraft engine which rides on retractable skis. This design is not capable of bank and turn control.

Japanese Patent No. 62-152960 A discloses a craft built as a conventional aircraft with retractable skis or foils. This design is not capable of bank and turn control and is subject to the frailties of aircraft construction in a marine environment.

In Russian PCT patent PCT/RU92/00238, the inventor discloses an AIR-CUSHIONED FLYING VEHICLE using retractable skis. This design is not capable of bank and turn control and is subject to the frailties of aircraft construction in a marine environment. The form of the skis is such that they taper and are wider away from the direction of travel whereas the present invention discloses the opposite foil configuration.

The following additional patents are cited in this application

United States Patents:

U.S. Pat. No. 2,722,189 Hobday—Nov. 1, 1955

U.S. Pat. No. 1,720,167 Clifton—Jul. 9, 1929

U.S. Pat. No. 2,364,676 Warner—Dec. 12, 1944

U.S. Pat. No. 3,132,619 Lopez—May 12, 1964

U.S. Pat. No. 2,795,202 Hook—Jun. 11, 1957

U.S. Pat. No. 2,972,974 Follett—Feb. 28, 1961

DES. 226,783 Lewis—Apr. 24, 1973

U.S. Pat. No. 3,627,235 Lippisch—Dec. 14, 1971

U.S. Pat. No. 3,661,111 Lippisch—May 9, 1972

U.S. Pat. No. 3,830,448 Lippisch—Aug. 20 1974

U.S. Pat. No. 3,952,678 Weston—Apr. 27, 1976

The present invention seeks to improve on these and other prior art references by providing a vessel utilizing the advantages of maritime construction with some aeronautical technology and construction methods to provide an economical and practical means for a synergy between what have been previously disparate arts.

OBJECTS OF THE INVENTION

It is a primary object of the present invention to provide a water-borne ground effect vessel capable of sustained high speed maneuverable operation in varying seas while safely and economically transporting passengers and or freight.

It is a further object of this invention to provide a vessel capable of travel speeds in excess of 100 mph with fuel efficiencies exceeding those of conventional ship design.

It is a further object of the invention to help fill the gap between high speed but expensive aircraft and slow cheap ships and to provide passenger and goods transport directly from city center to city center.

It is a further object of the invention to utilize existing harbor/marina infrastructure to service the more than 60% of the world's population living within 300 miles of a coastline or major river.

The present invention provides a viable alternative to the ever diminishing and overstretched airport capacity as airports become further constrained by urban expansion. Market studies confirm that there are hundreds of transport routes across North America alone which cannot be served well by anything other than high speed maritime transport. For example: Manhattan to the Hamptons. There are only three ways to make this journey at present;

A 14 hour automobile trip in traffic.

A three hour car trip to Connecticut and a slow boat across.

A three thousand dollar helicopter ride.

It is a further object of the invention to make previously inaccessible water bodies accessible by providing a vessel which is unaffected by surface conditions or depth variations that would damage the propellers of conventional (even hydrofoil) craft.

It is a further object of the invention to exploit a recent U.S. Supreme Court ruling favoring a now defunct ground-effect craft company in Florida in which ground-effect craft in general are now officially listed in the U.S. as boats and not airplanes. Similar language now exists in the International Law of Sea Treaty. Using the technology disclosed in the present invention, official government certification to manufacture and operate such craft can be obtained at vastly decreased costs as compared to aircraft certification. This can be accomplished by the adaptation of less expensive offshore race boat components, race boat engineering principles and race boat manufacture techniques. (It is not uncommon for such race boats to reach and sustain speeds in excess of 120 mph even in seas reaching 2 or 3 meters).

It is the application of race boat technology which has led to the present invention. Whereas most wing-in-ground effect craft development has been in the direction of making aircraft fly close to the ground, instead of designing a boat which can be made to fly over the water surface while substantially maintaining contact therewith.

It will be seen by those skilled in the art that race boats tend to find an average altitude and trajectory by skipping from wave crest to wave crest. It will also be observed that this is a very punitive method of transport as the pounding is so intense that only the most hardy of boaters can endure it—albeit just long enough to race. Further, fuel consumption of these vessels is excessive by reason of their need to displace enormous quantities of water to maintain their speed. Since, relative to air, water is some 800 times more dense than air, there is about 2–2.7 times greater resistance in water as opposed to air it would stand to reason that a maritime vessel which could be made to raise up out of the water and ride along using the wing-in-ground effect would incorporate the best features of a race boat and an aircraft.

An analysis of the fundamental construction of a race boat and an aircraft was done to isolate salient features for inclusion into a hybrid craft.

These features include:

Boat:

A rear-tail dragger drive configuration.

A hull shape comprised of various surface faces to cut through the water and maintaining directional stability while quickly shedding water.

The ability to come up on plane very quickly thereby reducing drag.

Plane:

Lightweight construction.

Airfoil shape and the ability to fly.

Bank and turn capability.

Economic operation relative to distance covered.

The problem addressed was how to get a lightweight, aircraft style bodied water vessel to rise above the water surface and sustain the pounding normally associated with high speed water borne travel The solution is a Variable Geometry Graduated Surface Foil.

In one integrated system; this invention solves the pounding problem of simple, flat, water plane skis with smooth entry 'v' shaped dead rise, and pyramid plan form of the water plane area. The curving pyramid plan form simultaneously forces the craft up and out of the water; all while gradually presenting proportionally less water plane surface area of itself to the oncoming wave faces as speed and vessel ride altitude increase. This invention's variable geometry surface foils retract up against the under belly of the craft, thus removing them selves from the hydrodynamic drag curve during the high drag transition from water-to-air borne operation. Then, only when vessel speed through the water has increased sufficiently to provide aerodynamic lift, are the foils deployed to expose this vessel's lifting body airfoil to the slipstream. This radically reduces total installed horsepower requirements. Less required horsepower means lower construction and operations costs.

The present invention includes therefore, a marine based air supported lifting body vehicle, with passenger safety pod, and variable geometry surface-foils with graduated lifting facets. Said facets are directly related to a cross-sectional "slice" or pie section hypothetically cut from the bow section of a race boat and then mounted solidly or on hinges with water releasing aerating steps cut into the water plane face. A race boat hull has superb lift and water shedding capabilities and, most importantly, the capacity to strike wave forms at random angles while still maintaining directional stability on a given course. The essence of the present invention is to provide such foils to incorporate this capacity to "lift and fly straight" as a race boat does. Additionally, by giving these foils variable geometry, banking and turning becomes possible wherein the vessels direction can be changed smoothly and passenger comfort maintained as G forces of a turn are absorbed and lessened by repositioning the passenger's body much as a motorcycle passenger is kept in alignment with the vertical axis of the motorcycle.

One of the main problems of offshore race boats is the tendency to come violently crashing back down after launching off a wave face at high speed. The hybrid design of this invention carries most of its weight with its lifting body airfoil shape. A far smaller portion of the vessel's weight is borne by the variable geometry water planing surface-foils. This balance of coordinated air and water lift give the craft instant and far gentler response to oncoming wave faces at speed. Then, due to the vessel's primary mass being carried by its lifting body airfoil, a much softer landing into the next wave crest is experienced than would be felt with the violent impact landing of an offshore race boat.

SUMMARY OF OBJECTS AND ADVANTAGES

Besides the objects and advantages of the variable-geometry graduated surface foils described above, several objects and advantages of the present invention are:

(a) to provide automatically graduated waterborne lift assist; which significantly reduces installed power requirements to overcome the early high induced water drag; easing the waterborne-to-airborne cruise mode transition;

(b) to radically increase maritime transport speed and efficiency, yet reduce power requirements;

(c) to provide a structure heavy enough to survive and protect passengers in an enclosed safety pod in the event of 100 mph catastrophic wave impact;

(d) to provide pilot-passive wave action response functions, similar to the foils' automated lift response to variable speed/power inputs—utilizing the kinetic power of an oncoming wave face; larger waves produce faster and larger lift responses, smaller waves produce proportionally smaller lift responses ultimately producing wave crest averaged flight altitude. The arching pyramid shape of the foil appendages respond smoothly to the occasional rough wave face and facilitate pilot-passive automated wave action response thereby making aeronautical and normal marine controls unnecessary because of the design's self balancing features.

(e) to provide twin independently operated variable-geometry surface foils to provide high speed bank turn ability. (Essential for craft stability and passenger comfort);

(f) to provide fixed aft mounted graduated surface foil which carries a larger trailing water plane surface to provide anti 'blow-over' properties essential for pilot passive pitch stability; such that, trailing water plane area is normally carried slightly higher than the tail's running surface and provides self balancing force by contacting the water surface only when the vessel pitch angle exceeds a pre-determined maximum; functions similar to a dragster wheelie bar which prevents nose up ride attitudes;

(g) to provide retractable variable-geometry graduated surface-foils for reduced water draft during port operations and improved efficiency during water surface operation, allowing the vessel's operation to and from existing ports and docks; Refinements to this vehicle using fully retractable surface-foils will yield full amphibious airborne operation;

(h) to reduce or eliminate the need for complicated aeronautical control surfaces;

(i) to simplify and reduce manufacturing and operational costs;

j) to provide maximum passenger comfort with the addition of shock absorbing suspension system to the foils;

(k) to further reduce manufacturing and operational costs by adapting less expensive offshore race boat components, race boat engineering principals, and race boat manufacture techniques wherever possible rather than tending towards far more expensive aircraft components;

(l) to provide innate design stability for pilot passive wing angle of attack, flight attitude and averaged altitude control from wave crest-to-wave crest;

(m) to provide a vessel powered variously by turbine (shaft driven) engines through a jet pump, turboprop engine or conventional marine engine driving a surface propeller, inboard outboard drive, or any combination of these or any other suitable propulsion unit.

In Operation

The present invention design overcomes one of the primary barriers to widespread public use of free flight ground-effect craft (those with no sea surface interaction device), hovercraft, and hydrofoils. That is, these vessel's inability, unless of massive scale, to operate in real world ocean conditions. Without a means to respond to naturally variable sea surface conditions a maritime craft will be confined to operations in only calm protected waters. Perfectly steady flight attitudes achieved by whatever means will find danger in the randomly tall wave crest. This invention provides for operation at high speed in the sea surface interaction zone while in efficient ground-effect flight; but allows for the natural variables required in flight attitude and altitude required in response to random sea surface conditions.

To achieve W.I.G. flight the vehicle must be accelerated to "rotation speed" (which will vary according to the size and weight of the craft.) To those skilled in the art, the concept of "rotation" is generally applied to aircraft and is easily understood as that speed which is sufficient for free flight to occur. Analogous to this concept of gaining W.I.G. is the manner in which a slalom water skier moves from a submerged position to a sustainable and highly maneuverable position upon the water surface.

Picture a slalom water skier in the water preparing to skim across the surface. His ski tip in front of him and just as importantly, his drag leg outstretched behind him. Forward momentum is provided from the ski boat's towline.

At first, the ski's surface alone does not provide enough lift to get him up and out of the water before the hydrodynamic drag on his body becomes so great his arms can no longer hold onto the towline.

He needs additional lift to overcome his body drag because at slower speeds the ski's water plane surface is not large enough to carry his weight.

This is where the drag leg comes in.

As pressure is applied from the towline the outstretched leg behind him must stiffen and press hard into the water. His stiffened drag leg, in a variable geometry to the power applied, forces his body up and out of the water. Only then does his ski function within the speed envelope for which it was designed. This invention works in the same way during the transition phase from water born to air born cruise mode. However, the slalom skier's single size water plane area, and variable geometry drag leg, are incorporated into a single graduated surface water plane appendage. Thus, this invention's variable geometry graduated surface foil.

Pilot-Passive Flight Control

The pilot-passive automated design of this invention is a function of its graduated planing surface shape.

It is larger and fatter at its root where attached to the underside of the craft and progressively smaller towards its tip which skims the water at speed.

As forward speed increases, water pressure increases, producing lift. The more lift, the higher the foil is forced out of the water, the smaller the planning surface exposed. This produces a natural balance of lift-to-drag throughout the vessel's speed envelope.

Conversely, reducing vessel velocity will automatically reduce hydrodynamic lift. Reduce lift and the foil or foils will sink deeper into the water, the greater the planing surface presented to the air/water interface. Thus equilibrium of lift is automatically maintained. The foil's shape also lends itself to sturdy structural design; fatter in the area of highest stress and skinnier at its tip to absorb and transmit smaller wave impact loads. Foil performance may be further enhanced through a shock absorbing suspension system consisting of; computer, electronic, hydraulic, air-ride suspension, and/or manual control aids.

This invention's hybrid design uses finesse instead of brute force by gliding from wave crest to wave crest on its lifting body airfoil with optimum mass suspended on the variable geometry surface skimming hydro-foils for a gentler response to each wave crest than would be possible with a conventional vessel.

We can liken this effect to the methods of an expert surfboard rider. With his outstretched arm behind him, his fingertips trace a trail across a wave face. Variable water pressure on his fingertips feeds back wave speed, angle of incidence, and trajectory information without his having to look behind.

The moment lever of water pressure through his fingertips and outstretched arm provide real time physical trajectory changes to his body mass and surfboard without conscious effort. Wave trajectory or breaking angle increase, and his body mass and surfboard are forced away from the wave and accelerate. Wave speed or breaking angle decreases, and his body mass and surfboard will decelerate, drifting gently back into the wave. The surfer's jointed outstretched arm and extended fingertips are analogous to this invention's variable geometry graduated surface foil or foils and illustrate the concept of pilot-passive flight control.

Variable Geometry Surface Foil

The foil profile may be straight, or a curving cross section of an offshore race boat type boat-bow shape with its trailing edge arching backward in a downward sweep. Foil face may be flat, convex, deep-vee or any combination thereof. It may be smooth faced, or with vented steps along it's leading edge for quicker water release, and reduced hydrodynamic drag. It may have fixed or moveable water planing facets to maintain proper planning surface attack angle. The foil, or, foils may be fixed, or of variable geometry to the craft's trajectory and flight attitude. Foil or foils may be mounted fore or aft vessel center of gravity, center of lift, or any combination of above. Foil design is not limited to maritime-based ground-effect craft; but also implies its application in seaplanes as a fully retractable water interface device.

Auxiliary Propulsion System

An auxiliary powerplant and water propeller/jet drive may be employed for hullborne operations. Such equipment may be in the form of conventional lightweight outboard or inboard/outboard units commercially available. A special bay in the hull will allow the auxiliary system to retract within the hull for foilborne operation. The auxiliary powerplant may be started, stopped, raised and lowered remotely from the cabin. Such a unit typically incorporates a reversible drive for backing and maneuvering.

Development Path

Prototype designs for the present invention are derived from several years of experimentation and experience in building high performance water craft. Body shape and airfoil sections were calculated using standard formulae. The method of construction and materials used are based on state of the art aircraft manufacture and illustrate the best and preferred method of construction for one skilled in the art.

Live tests of prototype shapes have been conducted using a variety of scale models being towed at high speeds and such tests have proven an inherent stability in the design.

A variety of power plants are found to be available in military surplus including, but not limited to Boeing 502-6 Gas Turbine Shaft engine and the Allison Model 250 Turbo shaft engine.

A variety of powered hinges suitable for attachment to the variable geometry foils are available for example those manufactured by Dana Marine products, particularly their fast-acting hydraulically controlled models.

Aircraft aluminum suitable for the construction of the vessels' space frame is readily available as is the technology for welding and shaping it to a high level of rigidity.

Weight tests for various composite products have been conducted, including but not limited to, traditional glass fiber/resin, balsa cored sections, carbon fiber etc and a preferred method of construction includes the use of Nida Core Polypropylene Structural Honeycomb which surpasses in price, strength and lightness, most of the other boat building materials currently in use.

The preferred method includes the building of a lightweight, buoyant sturdy vessel which lends itself to aerodynamic efficiency and resilience to the hostile elements of the sea and random wave patterns thereupon.

DETAILED DESCRIPTION OF THE INVENTION

Figure 1:
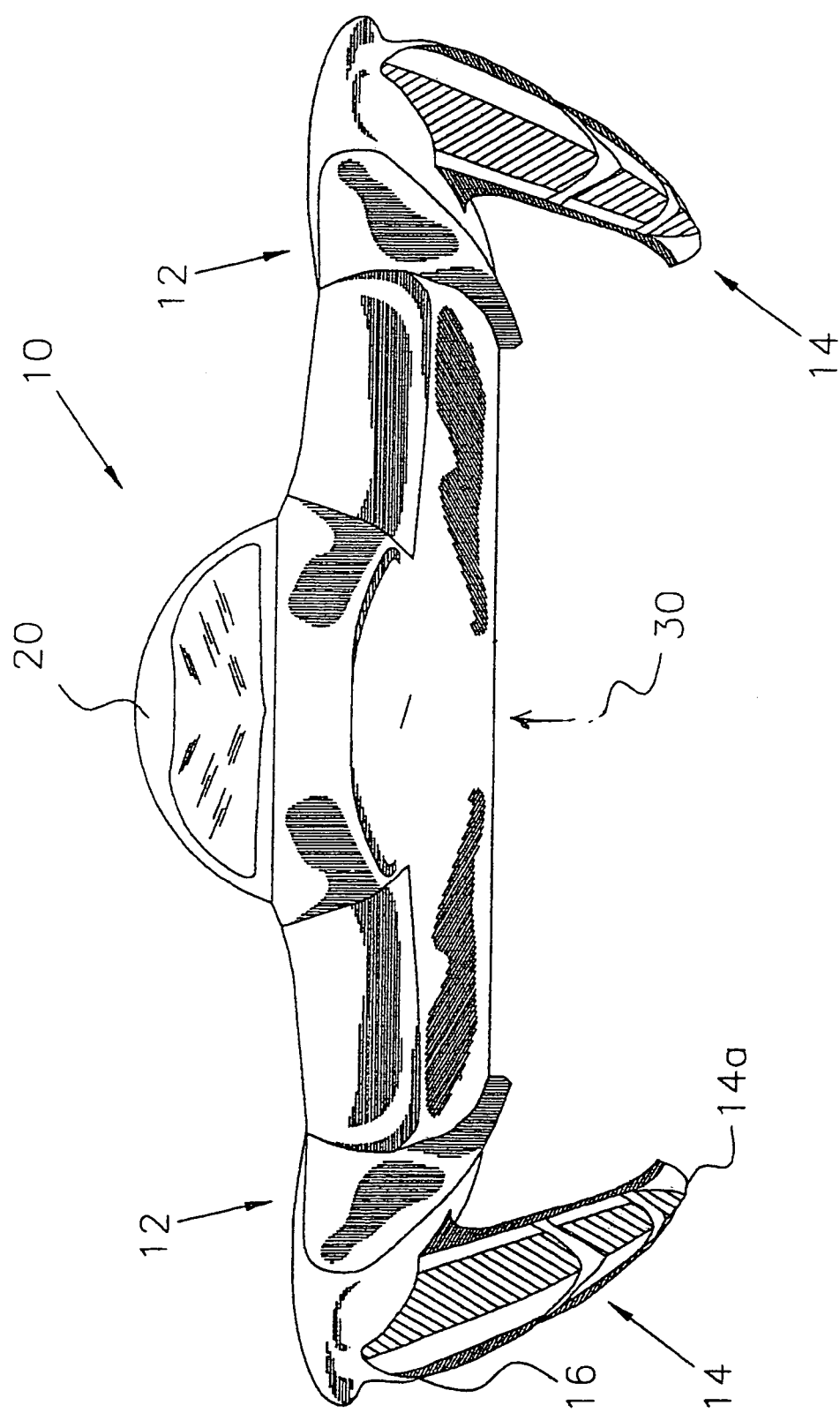
FIG. 1 is a front view of a scale model used in testing.

The following table provides a list of reference numerals and corresponding structural components described in the specification:

| | |
|---|---|
| 10 | WIG effect vessel |
| 12 | Blended-wing lifting body of the vessel |
| 12a | Passenger pod |
| 12b | Upper fuselage |
| 14, 14' | Starboard and port side variable-geometry graduated surface foils |
| 14a | Knife edge of the surface foil having a V-shaped planing surface |
| 14b | Slots on the surface foils for providing ventilation steps |
| 14c | Graduated planning surface of the surface foils |
| 14d | Trailing end, or tip, of the foil |
| 16 | Front end of the surface foil having a wide root |
| 16c | Protection cocoon for protecting the surface foil |
| 18 | Hinge mechanism |
| 18a | Hydraulic Actuator |
| 18b | Hydraulic pump system |
| 18c | Electronic gyroscopic control mechanism |
| 18d | Range of foil movement between retraction and deployment |
| 20 | Cockpit with Intermediate Impact Zone |
| 22 | Vertical stabilizer Airfoil |
| 24 | Overturn Prevention Tail |
| 26 | Cooling air duct extending to the engine room |
| 28 | Air intake for the propulsion unit (separate from cooling air inlet scoop) |
| 28a, 20b | Air inlet scoops for ducting cooling air to the propulsion unit |
| 30 | Wing having flat underside |
| 40 | Keel for accommodating passengers and machinery |
| 60 | Vehicle frame structure |
| 62 | Kevlar Polypropylene honeycomb core structural shell |
| 63 | Buoyancy spaces |
| 64 | Propulsion unit |

Referring now to the drawings, in which similar numbers designate like and corresponding parts throughout the several views, and in which the invention is designated overall by the numeral 10. FIG. 1 shows the flat underbody, wing 30 of the ground effect vessel 10. A substantially flat underbody is essential for efficiency in rotating the vessel 10 from its displacement mode to its Wing-In-Ground (W.I.G.) mode. Tests show that neither a convex nor a concave lower surface provide a surface "clean" enough to entirely lift the vessel up onto its foils. A concave lower surface makes it stick to the water surface in a similar fashion to the aerodynamics of a race car which make the car adhere to the track by increasing downward pressure. A flat surface provides a controllable lift. The addition of a longitudinal "keel" member 40 having a V-shaped planing surface as shown in FIGS. 7 and 8 gives more interior space for engine and drive components and increases directional stability (in concert with the vertical stabilizer airfoil 22).

Figure 2:
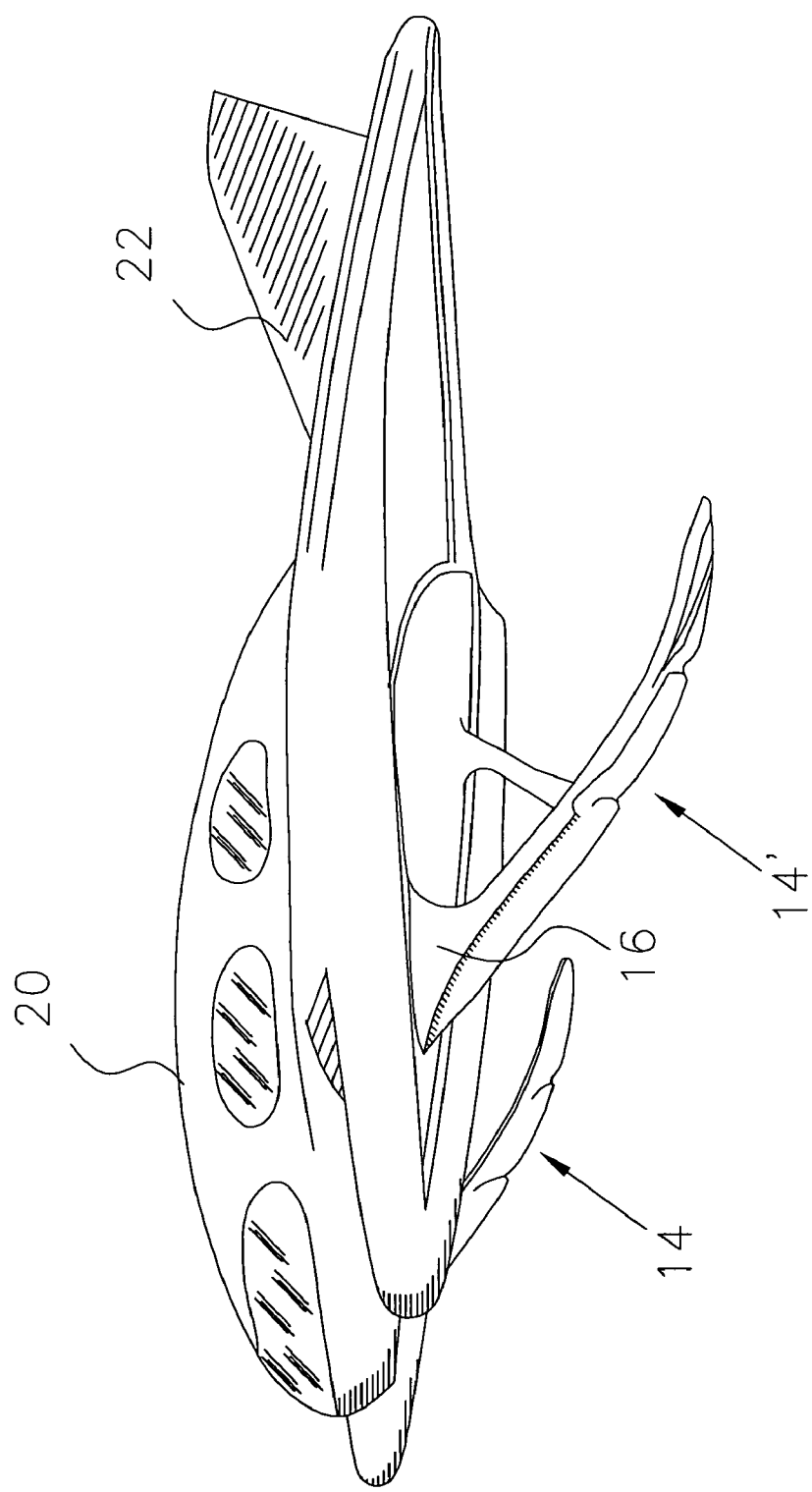
FIG. 2 is an angled side view of a scale model used in testing.
Figure 11:
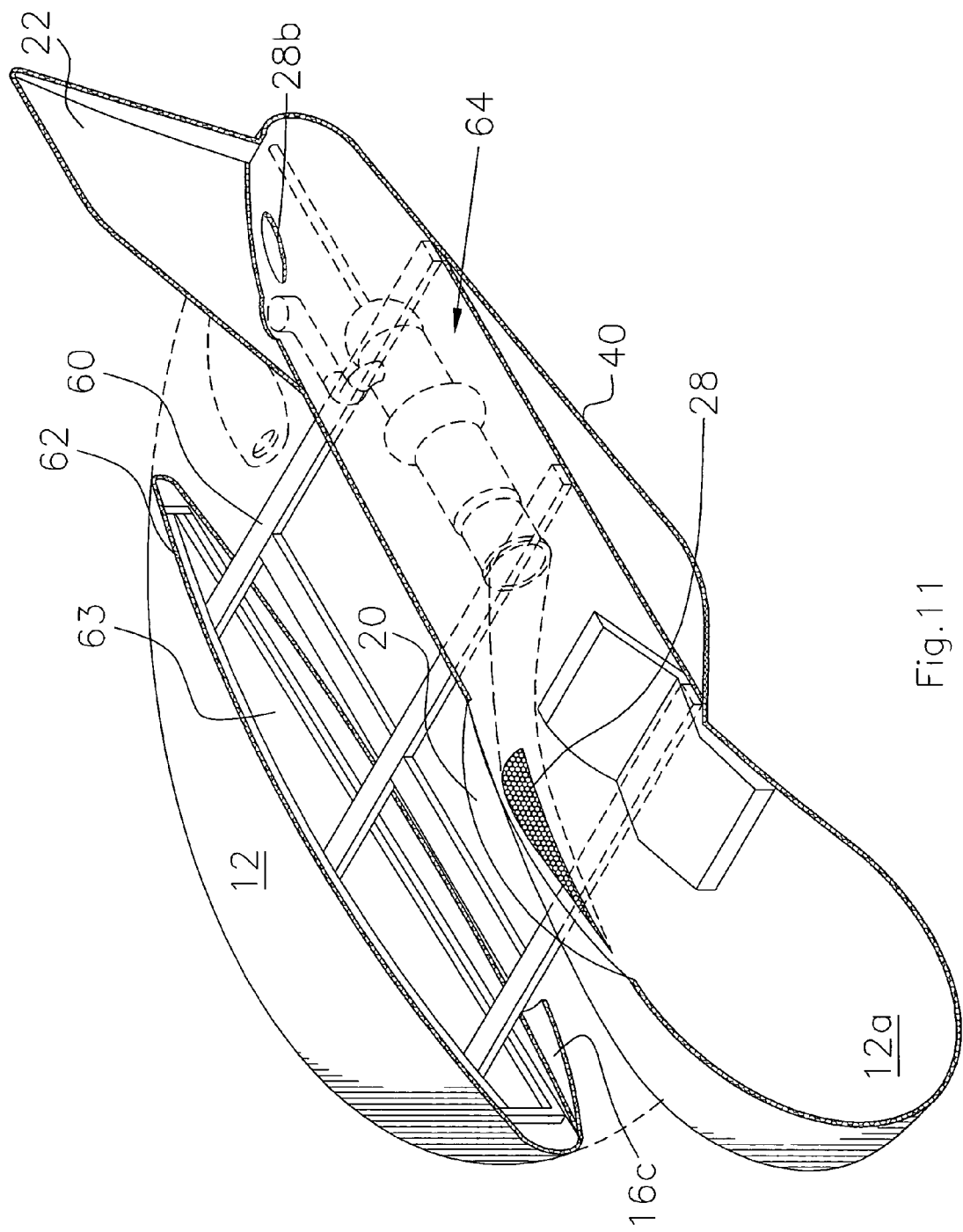
FIG. 11 is an isometric view, partially in section, of a larger scale embodiment.

Referring now to FIGS. 1 and 2, the rounded/blunt fuselage surfaces 12 and 20 lend themselves to strong, lightweight composite construction on an aluminum alloy space frame 60 (FIG. 11). Impact loads are more evenly distributed over such surfaces, laminar airflow is improved and lack of sharp corners and edges leave less opportunity to "trip" on the water and catch a wing edge on a wave. Similarly, a rounded shaped body increases stability should the vessel find itself sideways to trajectory at high speed. Prototype tests showed the vessel 10 to be particularly stable even crossing aggressive wave and wake patterns wherein the vessel tended to skip over the water surface as does a smooth stone.

Figure 7:
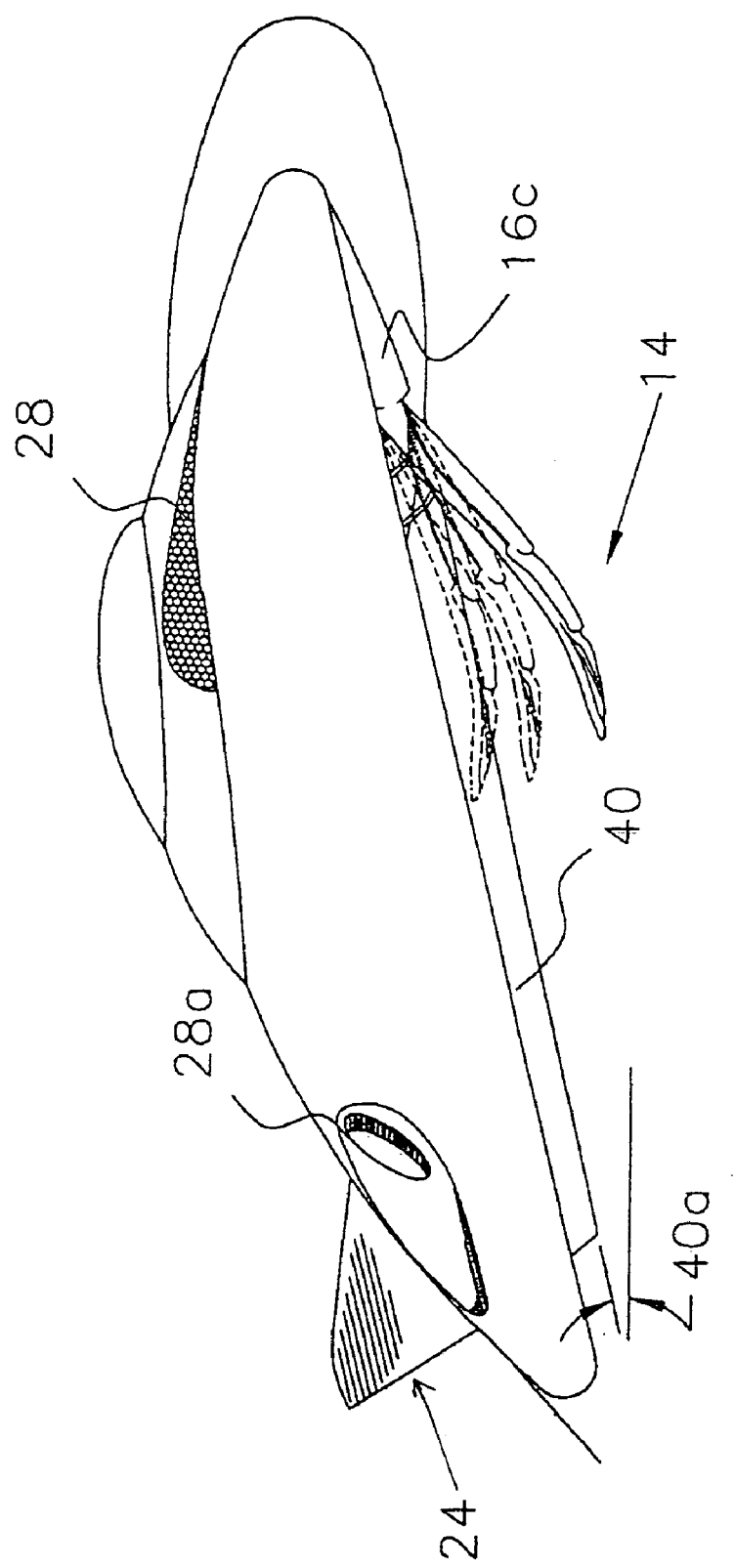
FIG. 7 is an elevational view of a larger scale embodiment of the invention.
Figure 8:
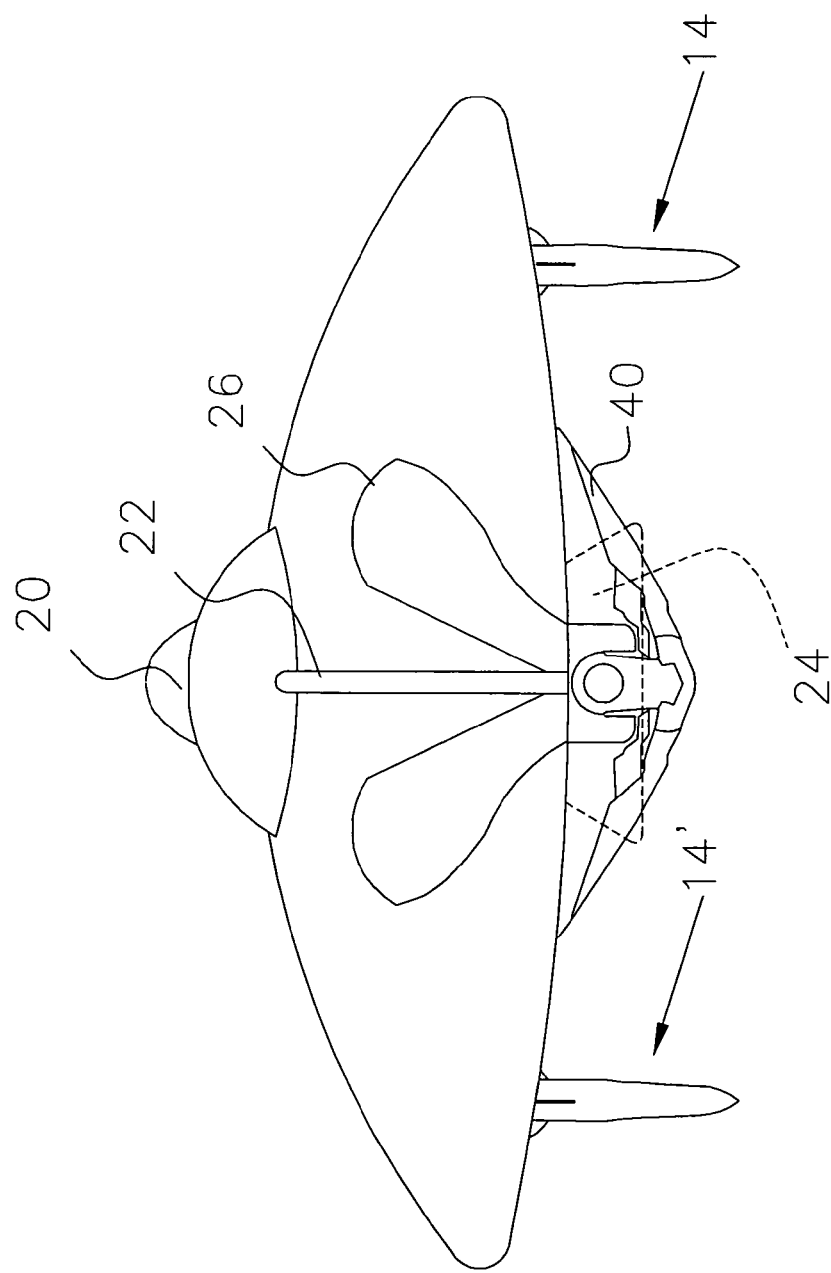
FIG. 8 is a rear view of a larger scale embodiment of the invention.
Figure 10:
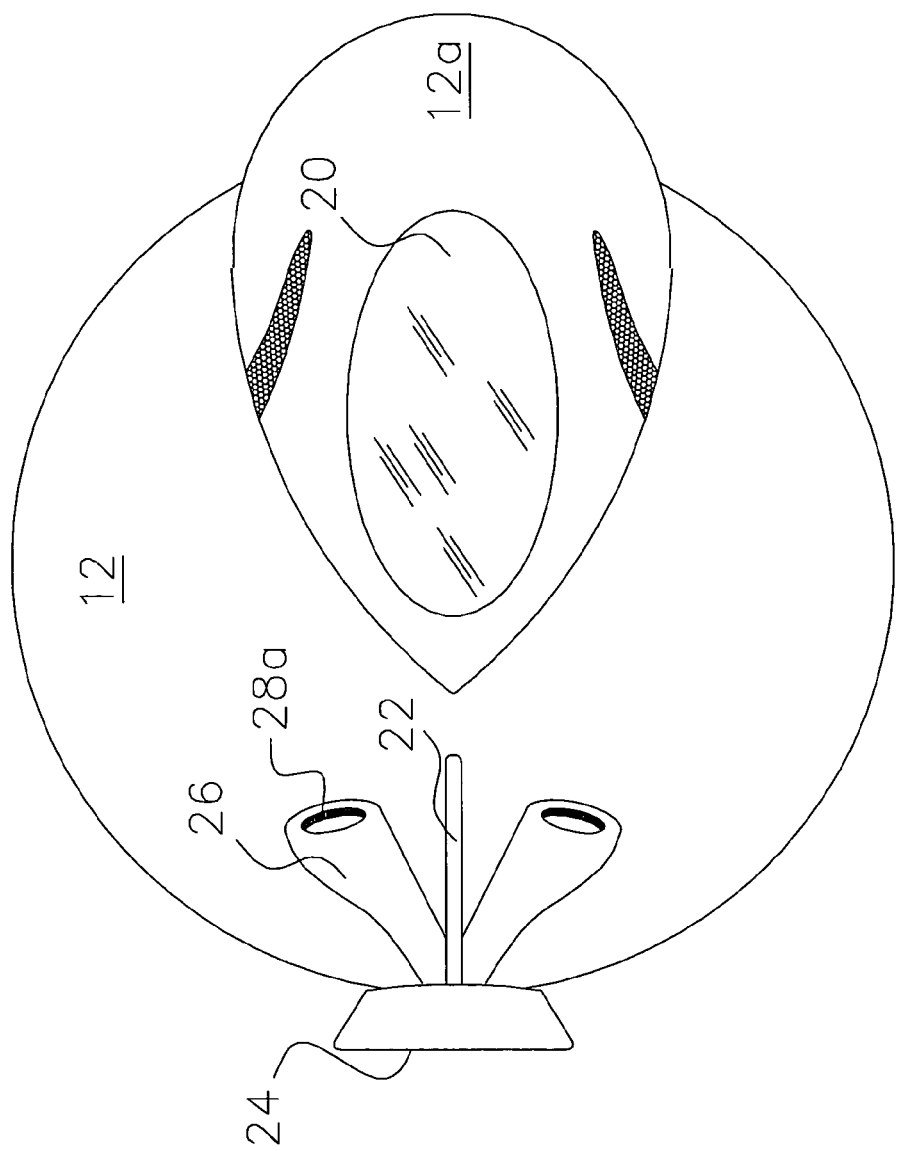
FIG. 10 is a plan view of a larger scale embodiment of the invention.

In FIGS. 7, 8, and 10, an overturn prevention tail 24 is shown. The effect of this is as a third, fixed hydrodynamic ride surface, similar in function to an aircraft's tail wheel or a race car's "wheelie bar". The surface rides clear of the water and is positioned slightly higher than the "V" shaped keel member 40. In the event that the vessel's longitudinal ride attitude "noses" up too far, the aftermost planing surface at the end of the tail will contact the water to force the nose back down. This configuration takes advantage of the increased density of water in relation to the air and replaces and improves upon the more commonly seen horizontal aero stabilizer of prior art ground effect craft designs. Such configurations suffer from the parasitic drag penalty of the neutral attack incidence of an aircraft style stabilizer. By utilizing the drag of the water to bring the nose of the vessel down, a much smaller surface area is needed.

Figure 3:
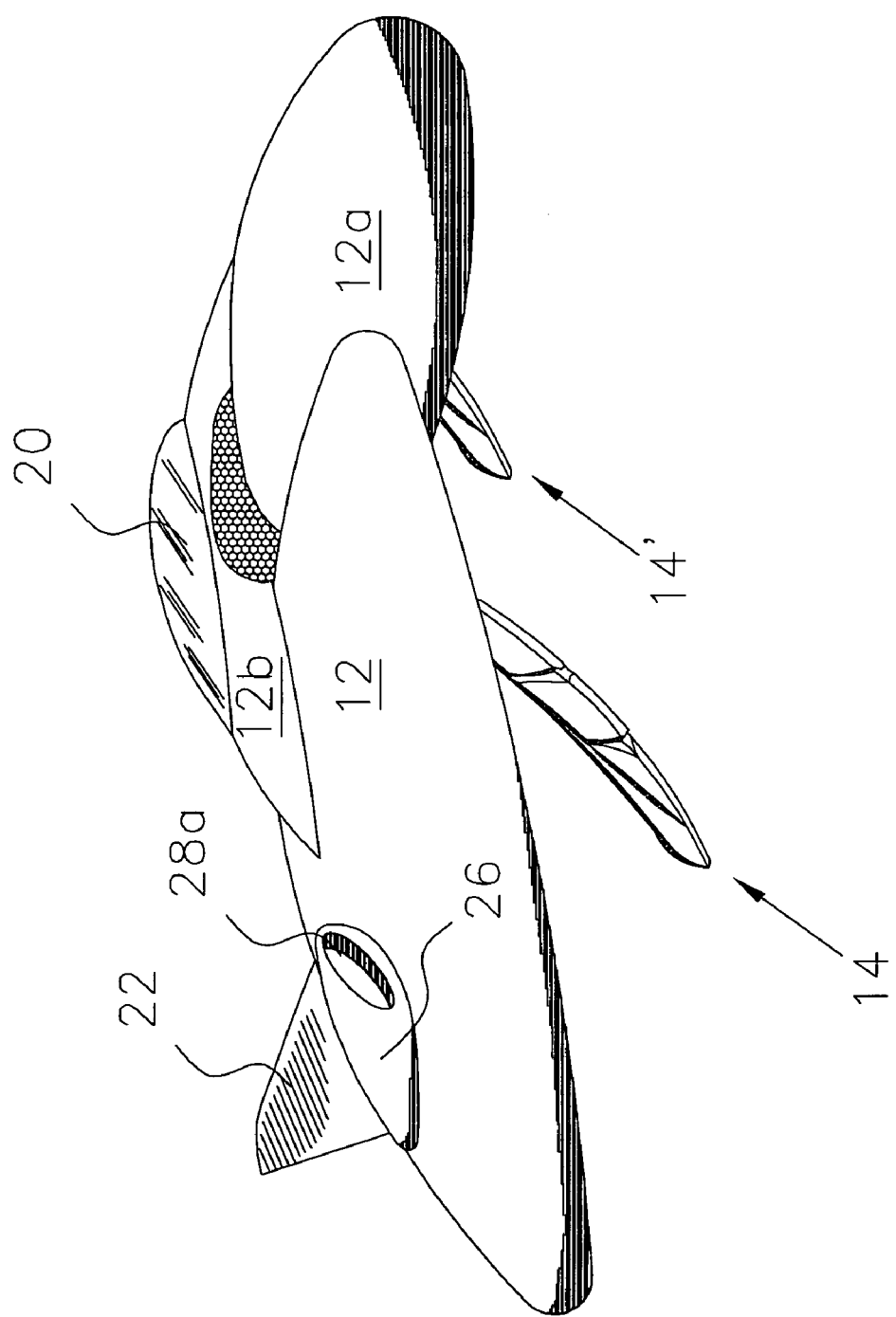
FIG. 3 is an angled side view of a larger scale prototype.

Referring now to FIGS. 2, 3, and 7 in particular to the relative position of starboard and port surface foils 14 and 14' and the underside, wing 30 of the vessel 10. The foils 14 and 14' are mounted on opposite ends of the underside of surface 12. The vessel 10 starts out in waterborne mode with forward foils 14 and 14' in retracted position. The vessel 10 reaches water plane mode and accelerates to what, in an aircraft would be considered "rotate speed". But, at this moment, instead of acting like an aircraft and retracting it's gear after rotation, this vessel's 10 running gear, foils 14 and 14' are deployed.

Figure 9:
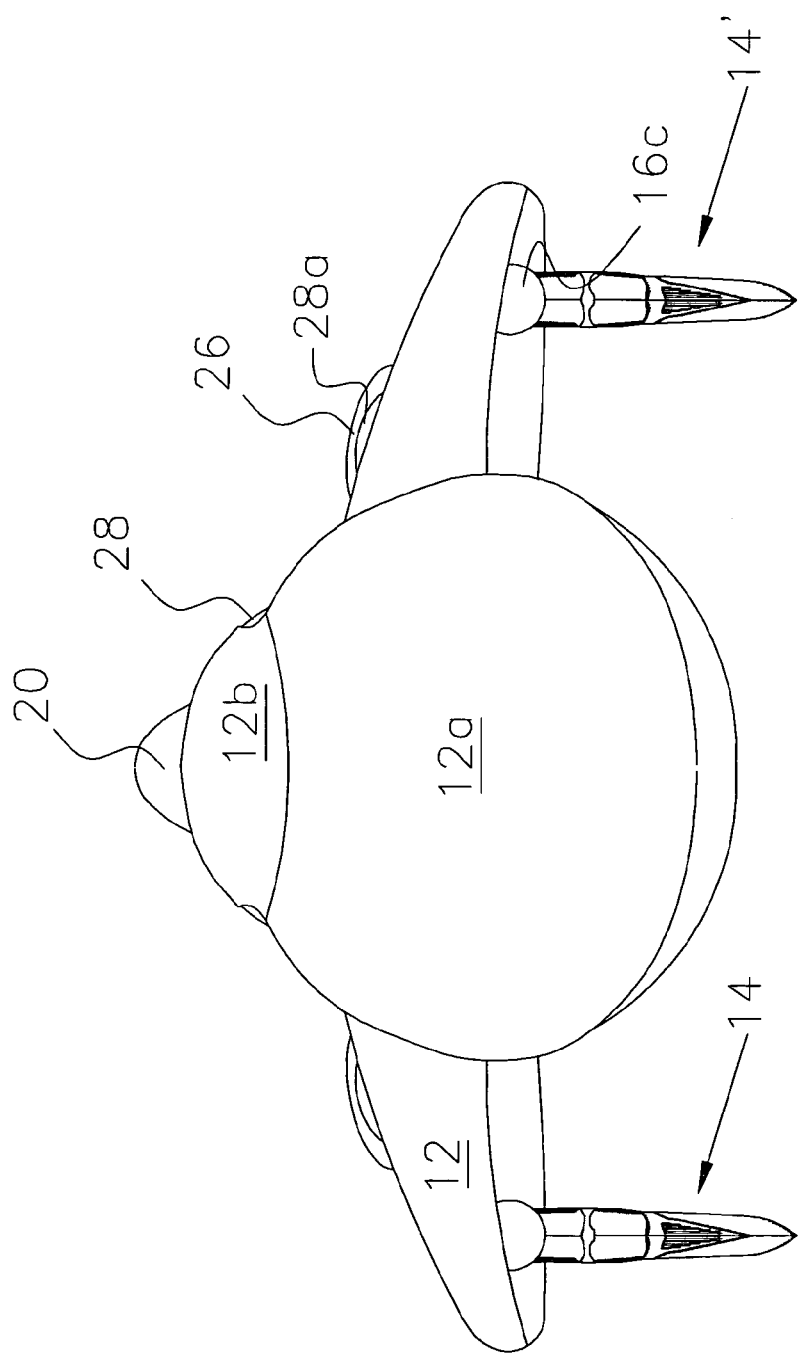
FIG. 9 is a front view of a larger scale embodiment.

In FIG. 7, there is an angle of attack between keel member 40 and water surface (angle 40a). Angle 40a is increased as forward speed of the vessel increases, the deployment angle of foils 14 and 14' are incrementally increased accordingly until foils 14 and 14' form the two front contact points between the vessel and the water surface. The foils 14 and 14' are fully deployed in the "rotated" configuration of the vessel. This describes the normal configuration of the vessel in the W.I.G. mode. It will be evident to one skilled in the art to see from FIG. 1, and FIG. 9, that any independent height adjustment of either foil 14 or 14' would result in the vessel "banking" to one side or the other. This demonstrates the versatility of the present invention as a highly maneuverable configuration which lends itself to automation through the use of gyroscopic/electronic control systems. By controlling the deployment angle of the foils from a central point (joystick, wheel, mouse, etc.) an operator would be able to operate the vessel with little or no physical effort, eventually doing so as intuitively as one now operates a motor vehicle, motorcycle, or bicycle for example.

Figure 4:
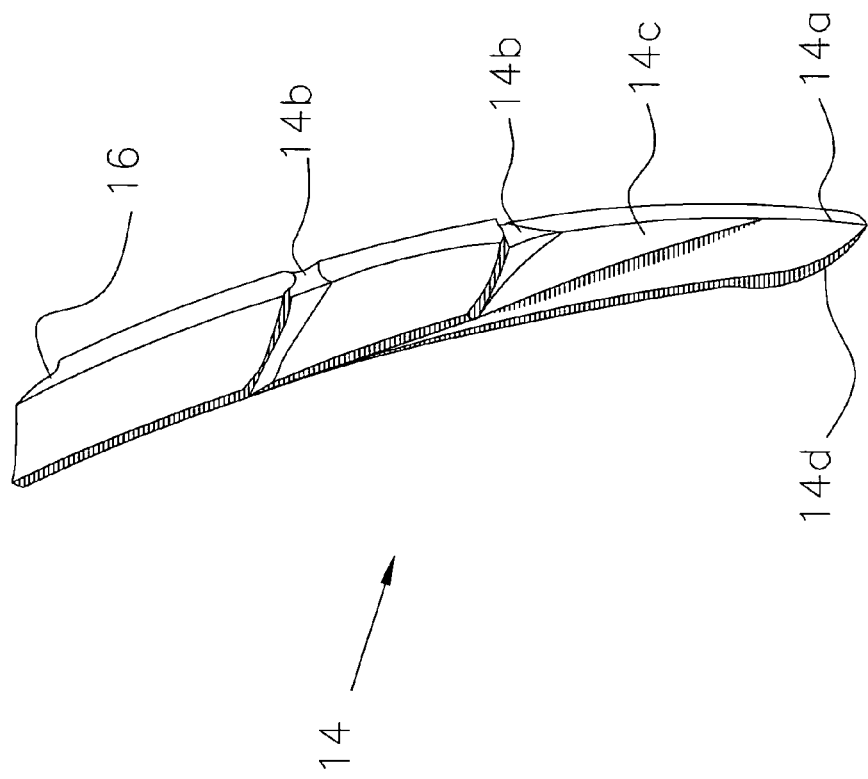
FIG. 4 is a perspective view of a variable geometry graduated surface foil as described.
Figure 5:
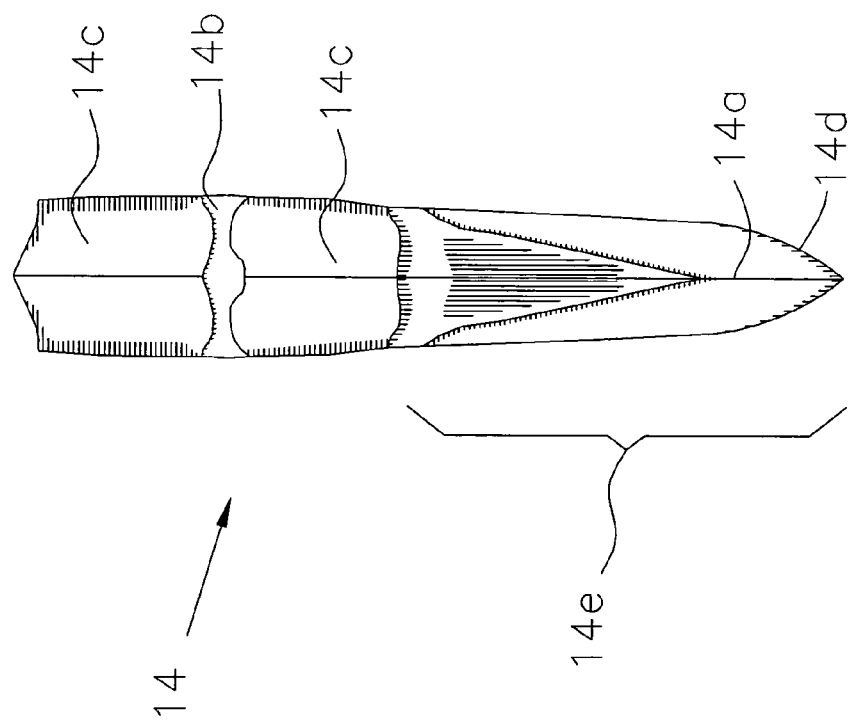
FIG. 5 is a front view of a variable geometry graduated surface foil as described.
Figure 6:
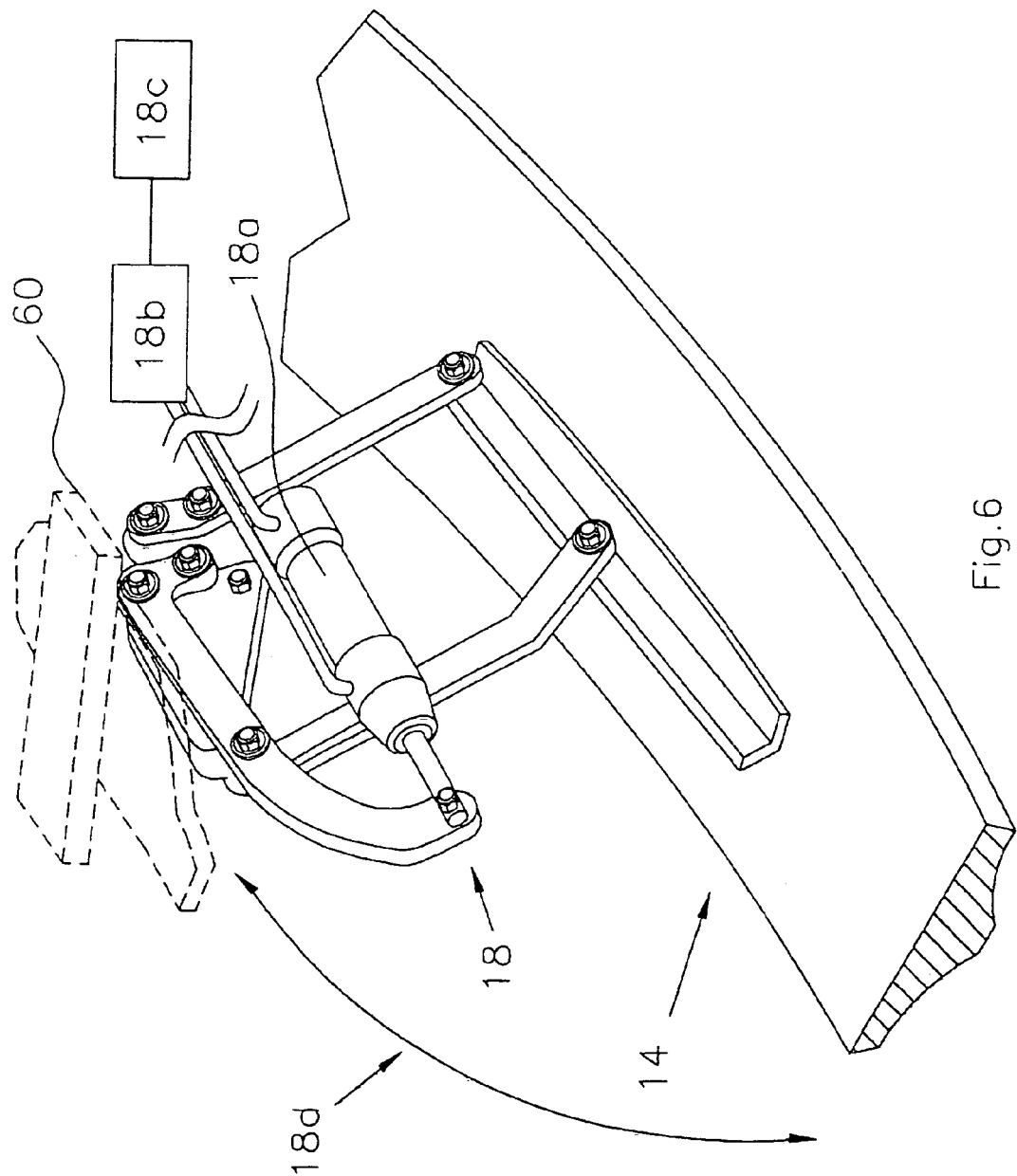
FIG. 6 is an isometric view of a hinge assembly of the type used in this invention to attach and adjust the variable geometry graduated surface foil as described.

Referring now to FIGS. 4 and 5 wherein the "bearing" surface of a foil 14 is shown. The knife edge 14a of the foil 14 is analogous to the bow of a race boat. The foil 14' is tapered 14c from a thick base 16 to a narrow tip 14d. Bearing faces 14c ride upon the water surface and slots 14b drive water aside to reduce drag. In a race boat, the hull incorporates a series of surface faces which present a water cutting edge and a means for water to be shed quickly, this configuration (as in the present invention foils 14, 14') facilitates directionally stable high forward speeds regardless of the vessel's contact angle with approaching wave faces. This means that the vessel is not easily knocked off course by wave striking perpendicular to the direction of travel. Prior art W.I.G. vessels sometimes rely upon a single forward contact point or "skid" which is difficult to control and doesn't lend itself to "bank and turn" control. In FIG. 6, high speed hydraulic hinges 18, (as manufactured by DANA corporation) are attached to hydraulic pumping system 18b which is connected to electronic/gyroscopic control means 18c. Such a configuration facilitates control of the foils 14 and 14'.

Referring now to FIG. 11 in which a space frame 60 provides firm mounting points for a propulsion unit 64 and foils 14 and 14' behind protective/streamline cocoon 16c. Space frame 60 facilitates the construction of a composite 62 structure having buoyancy spaces 63. Separate air intakes 28 for the propulsion unit 64 are provided. Without separate air intakes 28 and 28b, the use of a turbine engine is prohibited because such an engine will overheat without it. Reverse delta scoops (FIG. 3) allow rushing air over surface 12 to enter vent 28a without adding unnecessary drag to the vessel's forward movement.

A large vertical stabilizer airfoil 22 mounted on the top surface 12 provides directional control in the event of rudder failure. The wide, fat base, and long deck footprint of vertical stabilizer airfoil 22 additionally provides for necessary internal elements required to support the heavy structural loads of the overturn protection tail 24. The overturn prevention tail 24 is a third, fixed hydrodynamic ride surface, similar to an aircraft's tail dragger wheel. It also provides mounting points for twin rudders and race boat style surface piercing propeller or counter rotating propellers (not shown) or race boat style out drive or waterjet propulsion unit 64.

Referring again to FIG. 3, streamline nose pod 12a is attached to main wing section and cabin housing 12b and cockpit 20 sits atop the vessel.

While the above description describes the invention, it is not meant to represent the only construction method to which the principals herein outlined can be applied. It is envisioned that the present method herein described, represents a functional and economical vessel which utilizes the natural phenomena associated with ground effect travel and substitutions of parts or materials does not compromise the essence of this invention.

What is claimed is:

1. A marine wing-in-ground effect vehicle capable of sustained high speed maneuverable operation in varying seas, said vehicle comprising:

an aerodynamic lifting wing having fore and aft ends, port and starboard ends, and a longitudinal centerline extending medially in fore-and-aft direction of the wing, the wing further having a substantially flat underside;

a fuselage formed in the wing and comprising a cockpit, the fuselage having a streamlined nose pod extending forward of the fore end of the wing;

a longitudinal keel member formed under the wing for providing additional interior space and for increasing directional stability, the keel member extending substantially along the centerline;

a propulsion unit installed in the keel member, the propulsion unit having air intakes positioned above the wing on each side of the centerline;

air inlet scoops formed above the wing for ducting cooling air to the propulsion unit, the scoops provided on each side of the centerline;

a vertical stabilizer airfoil mounted on top of the wing proximal the aft end of the wing, the stabilizer airfoil extending substantially along the centerline;

an overturn prevention tail on the aft end of the wing, the tail extending aft of the propulsion unit and the vertical stabilizer airfoil;

port and starboard surface foils pivotably mounted under the wing and extending longitudinally along the fore-and-aft direction of the wing, each surface foil mounted substantially at the respective one of the port and starboard ends, each surface foil tapering from a wider front end to a substantially narrow trailing end and comprising a hinge device proximal the front end for attaching the surface foil to the wing, each surface foil further having a V-shaped surface adapted for planing on water; and an actuator attached to each surface foil, wherein each actuator is adapted to selectively and independently pivot the respective surface foil between a deployed position and a retracted position.

2. The marine wing-in-ground effect vehicle of claim 1, wherein the wing is constructed of lightweight composite material on an aluminum alloy frame, and the surface foils are attached forward of the center of gravity of the vehicle.

3. The marine wing-in-ground vehicle of claim 1, wherein the actuator is powered by a hydraulic pump system.

* * * * *